United States Patent

Lawson et al.

[11] Patent Number: 5,925,275
[45] Date of Patent: Jul. 20, 1999

[54] ELECTRICALLY CONDUCTIVE COMPOSITE HEATER AND METHOD OF MANUFACTURE

[75] Inventors: David Charles Lawson, Burlington; Earl George Wiese, Oakville, both of Canada

[73] Assignee: AlliedSignal, Inc., Morristown, N.J.

[21] Appl. No.: 08/942,655

[22] Filed: Oct. 2, 1997

Related U.S. Application Data

[63] Continuation of application No. 08/335,028, Nov. 7, 1994, abandoned, which is a continuation-in-part of application No. 08/159,970, Nov. 30, 1993, abandoned.

[51] Int. Cl.⁶ .................................. H05B 3/16; B32B 7/00
[52] U.S. Cl. ............................ 219/543; 428/245; 428/246
[58] Field of Search ..................... 219/543, 544, 219/547, 548, 549, 528, 529; 428/245, 246, 284, 286, 288, 289, 298, 301, 302; 252/510, 511

[56] References Cited

U.S. PATENT DOCUMENTS

| | | | |
|---|---|---|---|
| 2,889,439 | 6/1959 | Musgrave | 219/548 |
| 3,367,851 | 2/1968 | Filreis | 219/549 |
| 3,387,248 | 6/1968 | Rees | 219/549 |
| 3,657,516 | 4/1972 | Fujihara | 219/345 |
| 3,749,886 | 7/1973 | Michaelsen | 219/528 |
| 3,839,134 | 10/1974 | Fujihara | 161/62 |
| 3,859,504 | 1/1975 | Motokawa et al. | 219/345 |
| 3,900,654 | 8/1975 | Stinger | 428/214 |
| 3,923,697 | 12/1975 | Ellis | 252/506 |
| 3,935,422 | 1/1976 | Barnes et al. | 219/213 |
| 4,021,008 | 5/1977 | Eichenauer | 244/134 |
| 4,110,151 | 8/1978 | Morse | 156/519 |
| 4,138,707 | 2/1979 | Gross | 361/45 |
| 4,158,078 | 6/1979 | Egger | 219/548 |
| 4,245,149 | 1/1981 | Fairlie | 219/528 |
| 4,250,397 | 2/1981 | Gray et al. | 219/345 |
| 4,282,049 | 8/1981 | Morse | 156/62.2 |
| 4,429,216 | 1/1984 | Brigham | 219/528 |
| 4,468,557 | 8/1984 | Bylin | 219/528 |
| 4,471,212 | 9/1984 | Hager | 219/528 |
| 4,534,886 | 8/1985 | Kraus et al. | 252/502 |
| 4,732,351 | 3/1988 | Bird | 244/134 |
| 4,734,231 | 3/1988 | Morita et al. | 264/45.3 |

(List continued on next page.)

FOREIGN PATENT DOCUMENTS

| | | |
|---|---|---|
| 2 132 759 | 11/1972 | France . |
| 2132759 | 11/1972 | France . |
| 0162009 | 7/1957 | Germany ............... 244/134 |
| 1 615 123 | 5/1970 | Germany . |
| 1615123 | 5/1970 | Germany . |
| 2258095 | 1/1993 | United Kingdom ........... H02H 3/33 |
| WO 91/11891 | 8/1991 | WIPO . |
| WO91/11891 | 8/1991 | WIPO . |

OTHER PUBLICATIONS

ETIPs (Electro–Thermal ice Protection System)—AlliedSignal Aerospace Canada, undated.
Electro–Thermal Ice Protection Systems—AlliedSignal Aerospace Canada, undated.
Electro–Thermal Ice Protection System (ETIPS)—AlliedSignal Aerospace Canada, undated.

*Primary Examiner*—Teresa Walberg
*Assistant Examiner*—Sam Paik
*Attorney, Agent, or Firm*—White & Case LLP

[57] ABSTRACT

An electrically conductive composite heating assembly that has as its foundation an electrically conductive non-woven fiber layer laminated between layers of fiberglass and other dielectric material and has an abrasion resistant outer layer. A conductive silver adhesive connects copper bus bars to the fiber layer, and the copper bus bars connect to an external power source. The heater is designed to withstand repeated mechanical stresses and thermal cycles over extremely harsh environmental conditions. The heater assembly may have additional electrical shielding layers to provide ground fault protection. The heater is particularly suited for aircraft, windmill blades or other like structures that require ice protection.

11 Claims, 3 Drawing Sheets

U.S. PATENT DOCUMENTS

| | | | |
|---|---|---|---|
| 4,808,481 | 2/1989 | Luxon | 428/407 |
| 4,841,124 | 6/1989 | Cox et al. | 219/201 |
| 4,942,078 | 7/1990 | Newman et al. | 428/192 |
| 4,972,197 | 11/1990 | McCauley et al. | 343/704 |
| 5,023,433 | 6/1991 | Gordon | 219/548 |
| 5,168,236 | 12/1992 | Schuyler | 324/511 |
| 5,248,116 | 9/1993 | Rauckhorst | 244/134 |
| 5,250,228 | 10/1993 | Baigrie | 219/548 |
| 5,344,696 | 9/1994 | Hastings et al. | 428/220 |
| 5,361,183 | 11/1994 | Wiese | 361/42 |

ELECTRICALLY CONDUCTIVE COMPOSITE HEATER AND METHOD OF MANUFACTURE

CROSS REFERENCE TO RELATED APPLICATION

This application is a continuation of U.S. application Ser. No. 08/335,028 filed on Nov. 7, 1994 (abandoned), which is a continuation-in-part of U.S. application Ser. No. 08/159,970 filed on Nov. 30, 1993 (abandoned).

BACKGROUND OF THE INVENTION a. Field of the Invention

This invention relates to heating elements, and more specifically to an electrically conductive laminate heater element for use as an ice protection system to withstand repeated mechanical stresses and thermal cycles in extremely harsh aerospace applications.

b. Description of Related Art

Under certain flying and weather conditions, aircraft may be troubled by accumulations of ice on aerodynamic and structural components of the aircraft. If the ice is not properly eliminated from the aircraft, the aircraft's flying capabilities may be severely limited. The ice may alter the airfoil configuration of the wings to cause an unflyable condition; or accumulated ice may separate from the aircraft during take-off or during flight. The flying ice may jeopardize the mechanical integrity of the aircraft or be ingested into the engines and possibly cause engine failure.

Typical ice protection systems include hot gas chemical fluid, mechanical and electro-thermal systems. Hot gas systems are usually designed directly into the structure of the aircraft and utilize hot air bled from the engine as a source of heat. The practicality, however, of hot gas systems is diminishing with the introduction of high efficiency engines.

Chemical fluid ice protection is accomplished by dispensing a fluid onto the surface of potential ice buildup. The fluids reduce adhesion forces associated with ice accumulation upon the aircraft or lower the freezing temperature of the water below 32°, so ice is not formed. Chemical fluid systems are deficient in that they are time limited, expensive and present potential environmental concerns.

Typical mechanical systems employ some type of pneumatic device installed on the leading edge of a wing or strut that expands to crack accumulating ice. Mechanical systems require high maintenance, have a limited life and may effect the aerodynamics of the aircraft.

The use of electro-thermal heating systems as a means of protecting aircraft from harmful buildups of ice is well-known and is becoming increasingly more attractive. Most electro-thermal systems available today use a conductive metal heater element which, due to its small effective cross-section, converts electrical energy into heat energy. Unfortunately, the materials which have traditionally been used in aerospace heaters are not always the best suited to the application. Much of the aerospace environment is harsh and extreme in its treatment of these heaters. The most common metal used in heaters, copper, is not particularly strong or corrosion resistant.

In the most common case of copper heating elements, long narrow strips of very thin copper foil are laid down in a pattern so as to attempt to create a region of heating. The area covered by the strip is small in comparison to the total heated area. The result is a wide range of temperatures and heat flows. Between heater strips there is no heat generated. In some applications, this is one of the primary reasons for covering the outer surface of the heater with metal sheathing-to allow the heat to more easily spread.

The copper foil heater is also prone to catastrophic failure due to localized damage. Since the foil strip is continuous over a large area of the heater, any break at any location would result in total heater failure. This is a common problem among the currently manufactured aerospace heaters, especially when used on propellers. The propeller application submits the heater to a high degree of foreign object damage due to the suction effect of the blades. Stones, small objects, and sand are continually being drawn into the propeller arc, damaging the blade heaters.

Flame sprayed metals have also been used in a number of applications to produce a workable heater element. These heaters depend on the high temperature deposition of very thin layers of metal onto non-metallic surfaces. The nature of the process makes it very difficult to control the thickness of the deposited layer. This presents considerably difficulty in controlling the resistance of the heater, and thus the total power generated. Also, the tendency for delamination between metal and plastics is well documented.

An alternative to the aforementioned ice protection systems are fiber-based heating elements as disclosed in U.S. Pat. No. 4,250,397 to Gray et al., U.S. Pat. No. 4,534,886 to Kraus et al. and U.S. Pat. No. 4,942,078 to Newman et al.

Kraus and Gray disclose methods of processing these materials into finished products using high volume/low cost manufacturing. The intended applications for these fiber heaters focus upon consumer, industrial and agricultural areas. While these concepts of heater design may prove to be adequate for simple low-cost applications, they have been found to be less than satisfactory for applications that demand reliability. Further, the materials discussed in the above cited disclosures are not suitable for extended use in harsh environments.

Because of the shortcomings in existing fiber heater technologies, considerable research effort has been expended in developing improved material combinations. Research conducted by NASA has shown that conductive fiber heaters can suffer from problems of corrosion. The corrosion found during this research occurred at the junction between the fibers and the conducting materials used to apply power to the heater. Kraus et al. and Gray et al. disclose the use of non-conductive materials in the joining of the fibers to conductive strips and the use of weaving or stitching fibers into conductive strips. These methods contribute to corrosion and low reliability of connections.

The primary concern with the previously proposed methods relates to the lack of controlled contact between the conductive strips and the non-woven element. To guarantee that an electrical connection will remain low in resistance and high in reliability, the primary requirement is to maintain a gas-tight contact surface. If air is allowed to come in contact with the connection surface, oxidization will occur, increasing the contact resistance and lowering the reliability of the connection. Normally, in electrical connectors, this gas-tight requirement is met by using a clamping force to maintain an undisturbed connection surface. In the case of an ice protection heater assembly, no such clamping may be used as any such device would significantly increase the overall thickness of the heater assembly, making the heaters unsuitable for external aircraft applications. Additionally, the fibers are too brittle to clamp in place since the exclusion of air is dependent on plastically deforming both of the clamped materials.

Thus, methods of excluding air and other oxidizing gases has focused on adhesive bonding. Adhesive bonding was suggested by Kraus et al., but the adhesives cited were all non-conductive, leading to less than suitable results. It was found during testing that non-conductive adhesives would allow individual carbon fibers to contact the conductive strip (usually copper foil) in discrete locations. These small contact points, having very high current density, create "hot spots" and have been seen to burn out at relatively low power levels. The fibers were observed to "burn out" with a flash or spark. Initial attempts at using conductive adhesives were also disappointing. The first adhesives used contained a relatively small number of relatively large conductive particles, mixed with an epoxy adhesive. Some particles were inert materials with conductive coatings. In each case, the localized visible effect was observed as individual fibers burned out. Some of these adhesives used copper-based particles which would have been unsuitable from a corrosion perspective in any case. Electrically conductive pressure-sensitive tapes resulted in similar fiber failure. The focus of some of the developmental efforts has been in finding appropriate adhesives which will increase the contact surface area and still be compatible with the fiber materials.

High performance ice protection systems also require highly controlled electrical and thermal characteristics. The power density (watts per square inch) requirements for deicing or anti-icing applications vary significantly from application to application. Even within a specific application there is often the need to locally increase the power density. The ability to control these characteristics is dependent on controlling the material characteristics and manufacturing processes of the fiber. Existing work in this field has suggested that specific combinations of fibers and conductive particles are required to produce even heating. By improving the methods of manufacture, however, it has been found that the consistency of heating can be obtained without the need to include conductive particles.

The resistance of a fibrous heating element is based on the summation of each fiber resistance and the resistance of the fiber-to-fiber contact points. In a non-woven conductive fabric, the fibers are of identical composition and evenly dispersed through the fabric. If the fiber-to-fiber connections had zero resistance, the resistance of the fabric would be highly predictable, based only on fiber composition and content. If this were the case, it would be possible to produce consistent resistive heaters using any of the methods proposed by Kraus et al. and Gray et al. in their respective patents.

Unfortunately, the contact points between the fibers are not well controlled prior to fabrication into a finished heater element. The resistance of a fiber-to-fiber connection is similar to the resistance of traditional electrical connections. The ideal electrical connection, for minimum resistance and maximum reliability, must have fairly high contact stresses. These contact stresses are normally termed Hertzian stresses. They relate to the degree of intimate contact between the two conductors. When the fabric is in the dry, as-manufactured state, the fiber-to-fiber contacts vary from no connection to intimate connection. The binding agent on the fabric, required for mechanical handling, does hold some fibers in contact, preventing extremely high resistance to occur. The addition of conductive particles increases the number of contact points by acting as electrical bridges between fibers. This results in a more even resistance across the heater fabric.

Proposed methods of manufacture for fiber-based heaters have included the immersion in, or dispensing of, liquid adhesives. These adhesives are intended to bind the heater element to a resilient mechanical carrier sheet or insulator. Since these methods do not control fiber-to-fiber contact, they have been found to be unacceptable.

SUMMARY OF THE INVENTION

This invention relates to heater elements intended for use in applications requiring high reliability in harsh environments. Such heaters would be suitable for ice protection systems on aerospace structures, windmill blades or other like structures where the operating life and performance of the heater is of significant concern.

According to the present invention, the foregoing and other objects are attained by a heater assembly that consists of a resistive heater subassembly integrated with a laminated composite protective carrier. The resistive heater subassembly comprises a generally co-planar resistive heater element and structural and bonding layers. The resistive heater element may be any substantially porous, woven or non-woven, electrically conducting web, such as a metalized fabric. In the most preferred embodiment, the resistive heater element is a non-woven fabric consisting of chopped nickel-coated carbon fibers (NCCF). The fibers provide the conducting means for the electrical current which provides heat to the aircraft surface in an ice protection application.

The composite carrier provides mechanical integrity and resistance stability to the heater subassembly. The thickness and composition of the composite carrier will vary with the application. Typically the composite carrier includes multiple mechanical structural layers, bonding layers and electrical insulation layers for improved dielectric strength, mechanical and erosion protection and thermal insulation. The resistive heater layer is connected to an external power source by way of conductors and a conductive adhesive.

Alternatively, the composite carrier may contain additional layers of electrical shielding to provide ground fault protection to the heater assembly as disclosed in U.S. Pat. No. 5,361,183 entitled "Ground Fault Protection for Electrothermal De-Icing Applications", issued to co-applicant E. G. Weise and assigned to the same assignee, the disclosure of which is hereby incorporated by reference.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the claims.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which.

DETAILED DESCRIPTION OF THE INVENTION

The following detailed description, which describes only the preferred embodiment of the invention, is understood only to be an illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

The present invention relates to improvements in heater design and manufacturing methods for aerospace applications. This invention allows the practical utilization of conductive fiber heater technology for applications requiring high reliability and durability. One particular application is de-icing or anti-icing applications in the aerospace industry. Accordingly, reference made to ice protection applications throughout this section shall mean to include both de-icing and anti-icing applications.

The heater assembly 20 consists of a resistive heater subassembly 40 integrated with a laminated composite protective carrier 50. One aspect of the invention relates to methods of controlling and maintaining the basic electrical resistance of the finished heater assembly 20. It has been found that certain problems inherent in non-woven fiber fabrics can be eliminated by appropriate manufacturing methods. Further, improvements in overall heater reliability can be achieved by the use of specialized materials to make external electrical connections to the heater subassembly 40.

Figure 1:
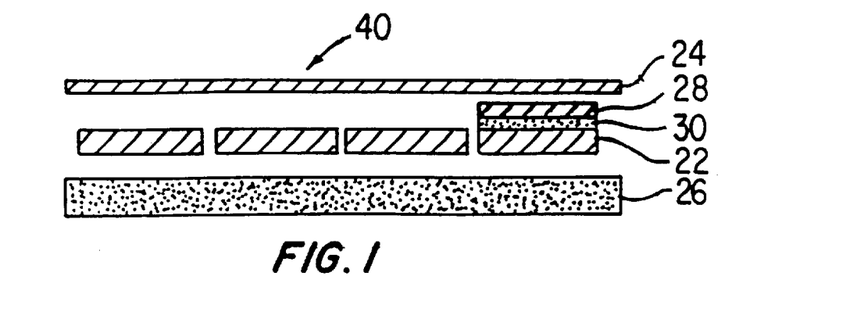
FIG. 1 is an exaggerated representation of the layered components of the heater subassembly.
Figure 2:
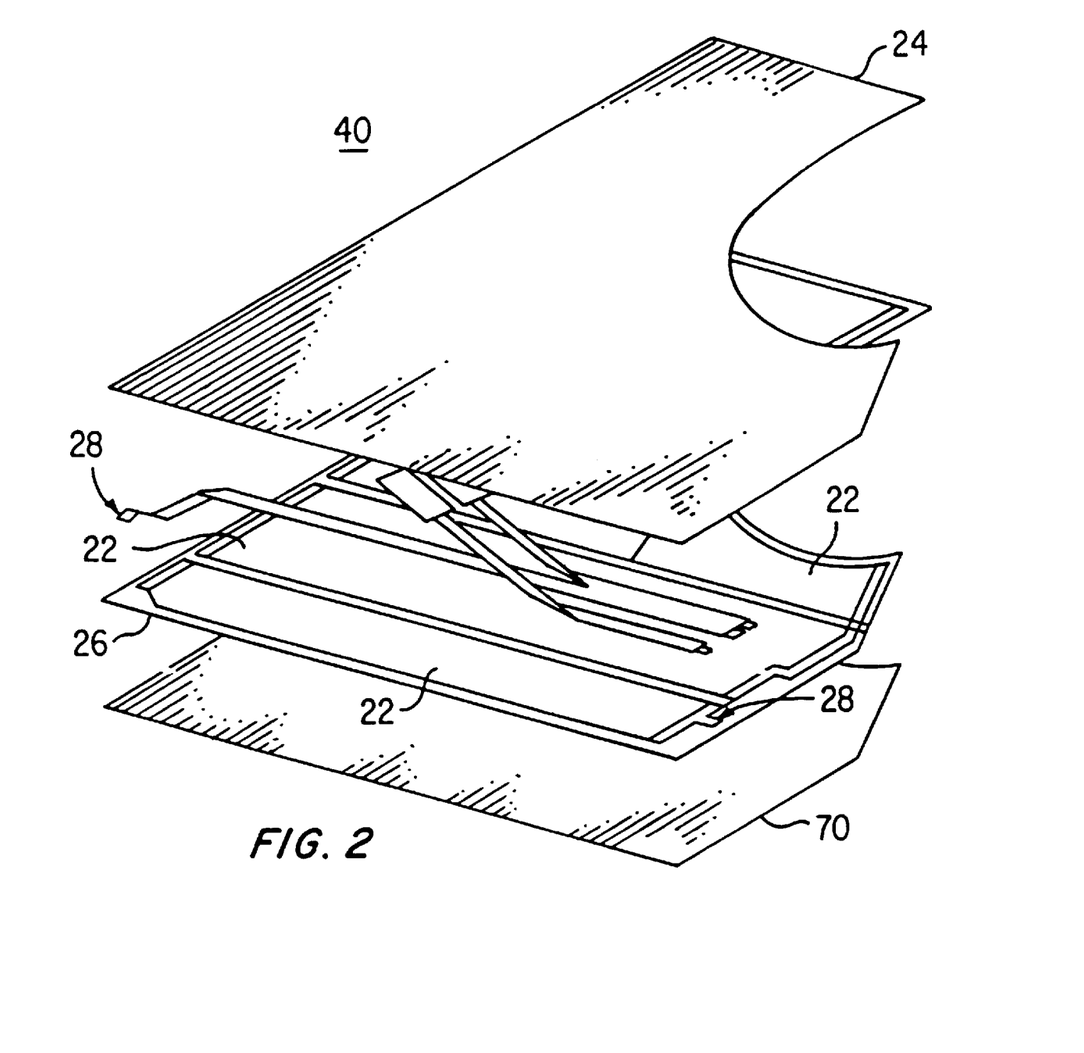
FIG. 2 is an isometric view of the layered components of the heater subassembly.

Referring to FIGS. 1 and 2, the resistive heater subassembly 40 is formed from a plurality of generally co-planar layers that have been bonded with a laminating resin and cured into a laminate structure using standard laminate technology. At least one of the layers is a resistive heater element 22. Resistive heater element 22 may be any substantially porous, woven or non-woven, electrically conducting web, such as a metalized fabric. Preferably, resistive heater element 22 is a commercially available non-woven fabric consisting of chopped nickel-coated carbon fibers (NCCF). The fibers provide the conducting means for the electrical current which provides heat to the aircraft surface in an ice protection application. The fibers preferably range in length from ¼ inch to one inch. Fibers longer than one inch are difficult to disperse in an even manner. Fibers shorter than ¼ inch are not preferred because the short fibers create a large number of fiber-to-fiber connections which cause an increased potential for variations in resistance. The resistive heater element 22 occupies substantially the entire surface area of heater assembly 20 and may be arranged in many possible configurations such as one continuous sheet or multiple sections as shown in FIG. 2.

Resistive heater subassembly 40 also comprises a first structural layer 24 and a first adhesive layer 26 disposed on opposite surfaces of the heater layer 22 to provide mechanical strength and bonding capabilities, respectively; a first strip of conductive metal 28 attached along one edge of the resistive heater element 22; and a second strip of conductive metal 28 attached along the opposite edge of heater layer 22. Structural layer 24 is meant to define a mechanical carrier layer that provides strength and support for the resistive heater 22 which by itself has little mechanical or structural integrity. Acceptable structural layers 24 include fiberglass cloth, aramid fiber cloth, high modulus polyethylene fiber cloth, or polyimide films. It is preferable that the structural layer 24 be non-conductive.

The prior difficulties in maintaining consistent resistance throughout the heater element subassembly 40 are eliminated by controlling the amount of a binding agent in adhesive layer 26 (typically an epoxy or a modified epoxy). The heater element subassembly 40 is cured under a minimum vacuum of 25" Hg to cause the adhesive to penetrate the layers of the heater subassembly 40. The control of the total resin content in the finished heater assembly 20 is a critical factor in its fabrication and is preferably controlled to less than 60 percent, but greater than 35 percent of the finished heater subassembly 40 weight Typical composite structure fabrication methods attempt to reduce the resin content to near 35 percent to 40 percent to improve the strength-to-weight ratio of the laminates but is not preferred because less than about 35 percent resin content tends to result in a laminate which is too dry and liable to suffer from porosity. Although resistance values have been seen to be acceptable, this level of resin content is not acceptable for de-icing applications because the heater element is too susceptible to damage in the harsh aerospace environment. When the percentage of resin content is greater than about 60 percent of the finished laminate weight, the resistance of the heater starts to increase rapidly. As the resin content is increased to around 80 percent, the basic resistance of the fabric increases by about 40 percent. The reason for the higher resistance of high resin content laminates is attributable to the lack of contact forces between the individual heater element fibers. When the resin content is such that its volume is significantly greater than the volume of fibers, the vacuum pressure applied to the laminate is actually applied to the upper surface of the liquid resin. Thus, the fibers are not directly compressed, but rather, the pressure is applied equally to the resin that surrounds all surfaces of the fibers. The result of this method of pressure application is that the forces on the fibers are more evenly balanced and do not result in high fiber-to-fiber contact forces. Thus, the resistance can be expected to vary throughout the non-woven fabric and to increase in an overall sense.

Preferably, the invention comprises a resin content of between 40 percent and 60 percent. When the final resin content is controlled to between 40 percent to 60 percent, the resin is only sufficient to fill the voids between the dry fibers, allowing the cure pressure to compress the fibers in the heater element. Therefore, contact between the conductive fibers is assured, and resistance is controlled.

Preferably adhesive layer 26 is a film adhesive. In this embodiment, the resistive heater subassembly is cured under a minimum vacuum of 25" Hg vacuum at a maximum temperature of 270° F. The film adhesives typically consist of epoxy, modified epoxy, nitrile phenolic or modified phenolic resins. These adhesive systems allow a dry lay-up to be performed, eliminating the difficulty of handling the non-woven NCCF fabric when wet with adhesive. The film adhesive viscosity is reduced by the elevated cure temperature. The vacuum applied to the dry lay-up compacts the dry layers and removes the air within them. Thus, when the temperature is elevated, the film adhesive liquefies and is drawn into the voids in the compacted lay-up.

It is also preferred to use a film adhesive because it offers greater flexibility during the layering of the heater element subassembly 40. The typical viscosity of most liquid or paste adhesive systems is such that once the non-woven NCCF fabric is impregnated with adhesive, it cannot be readily repositioned or moved in any way without tearing. Because the film adhesive is virtually "dry", the pieces of the relatively fragile heater element can be positioned several times before finally set into position. Further, the use of pre-manufactured film adhesives gives greater control over the total resin content as well as the distribution of resin since the manufacturing of the film adhesive is well-controlled on automated equipment.

The vacuum pressure may be applied to the laminate by any well known method such as a vacuum bag, a technique used predominantly in composite structures manufacturing. Similarly, the same pressure may be applied by means of a pressurized autoclave. In this instance, the pressure is applied through the use of a pressure bag, where the internal gasses of the bag are allowed to vent to atmosphere. Higher pressures may be attained by this means that may effectively reduce the amount of resin content required. This basic technology is also typical of composite structures manufacturing.

In cases where it is desirable to add a greater amount of resin to aid in the wetting-out of dry fabrics, a bleeder layer of porous material can be used inside the vacuum bag to reduce the final resin content. This bleeder cloth would be separated from the finished heater element by means of a release cloth, specially treated to allow easy removal from the cured heater assembly. By controlling the number of layers of bleeder cloth and the initial resin content, accurate control of finished resin content can be attained.

Conductive metallic foils 28 connect an external electrical power supply to the resistive heater element 22. The metallic foils should be fabricated from highly conductive materials, preferably copper. Preferably, a highly dispersed silver-filled adhesive 30 bonds the conductors to the edges of heater element 22 and provides a well distributed electrical connection, free of locally increased current densities that cause burn-out. The metallic foils 28 are connected to the heater element 22 and to each other in such a way to provide an electrical circuit arrangement that provides a continuous current flow through the heater element 22. The necessary electrical arrangement is known to those skilled in the art.

The use of silver-filled adhesive provides an intermediate metal between the carbon fiber and the copper conductor and seals moisture out of the metal to fiber interface. Using a pure-silver particle-filled adhesive having a volume resistance of less than 0.004 $\Omega/cm^3$ enables an even current density to be maintained. The small particle size of these highly conductive adhesives provide contact with the individual fibers in thousands of locations. Since the proximity of each contact point is very close, and the thermal conductivity is also very high, the local resistance of each contact does not have the opportunity to burn up the fiber due to self-heating. Further, the polymer base of the adhesive is fairly impervious to ingress of moisture. Thus, previous problems with moisture-induced corrosion are eliminated.

Figure 3:
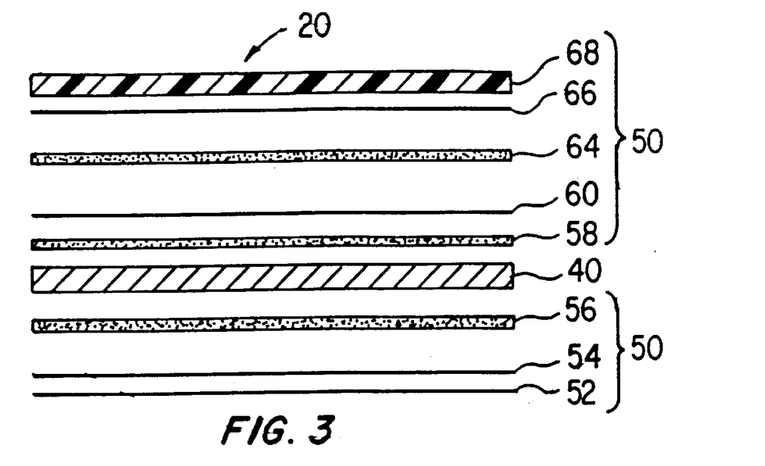
FIG. 3 is an exaggerated representation of the layered components of the heater assembly.

Resistive heater subassembly 40 is embedded within a protective carrier laminate 50 as illustrated in FIG. 3 in order to increase the mechanical and electrical integrity of heater assembly 20. The protective carrier 50 prevents mechanical breakdown of the heater subassembly 40. Physical penetration of an energized heater element layer 22 may result in localized arcing a conductive aircraft surface. This condition has the potential to produce carbonaceous deposits around arcing locations, thereby creating a cascade failure of adjacent carbon fibers shorting to the aircraft; a cascade failure leading to large scale heater failure; and combustion of fuel from probable fuel tank leaks around fasteners.

The protective carrier laminate 50 comprises in a layered configuration from bottom (attached to the aircraft surface 48) to top: a second structural layer 52; a preferred third structural layer 54 to increase dielectric strength or electrical isolation between resistive heater element 22 and the aircraft surface 48; a second adhesive layer 56; a third adhesive layer 58; a fourth structural layer 60; a fourth adhesive layer 64; a fifth structural layer 66; and a sacrificial abrasion layer 68; wherein the resistive heater subassembly 40 is positioned between the second and third adhesive layers 56 and 58 to complete the assembly of heater assembly 20. The structural layers and adhesive layers are preferably of the same materials and composition as used in the manufacture of the resistive heater subassembly. Sacrificial abrasion layer is any abrasion resistant, water impermeable and flexible coating such as AF32 nitrile phenolic film adhesive manufactured by 3M. The completed lay-up is cured under a minimum vacuum of 25" Hg and at approximately 295° F. for a minimum of 90 minutes to allow the preferred film adhesive change state and bond the lay-up into one integrated heater assembly 20. Alternatively, if resistive heater 40 is to be laminated into a carbon fiber-based composite structure, dielectric isolation is still required. For most low voltage (200 VAC and less), however, a suitable dielectric may be obtained from a single layer of style 120 (4-Harness Satin weave) fiberglass cloth on each side of the heater.

Figure 4:
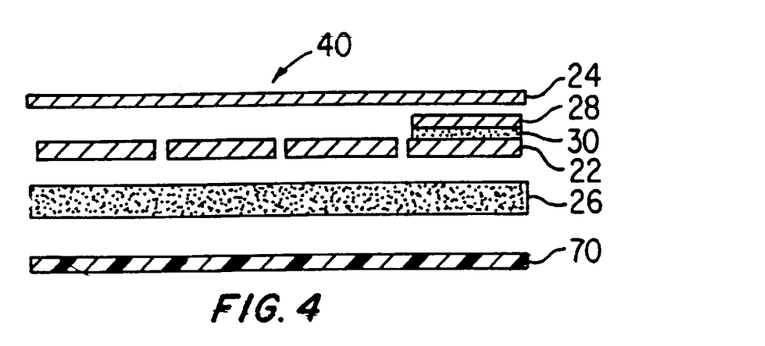
FIG. 4 illustrates FIG. 1 having ground fault capabilities.
Figure 5:
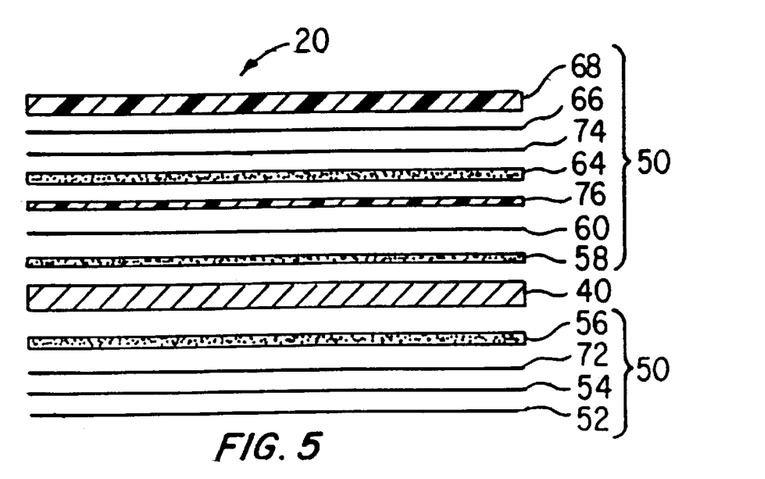
FIG. 5 illustrates FIG. 3 having ground fault capabilities.

In the preferred embodiment, heater assembly 20 provides ground fault protection circuitry. In this embodiment, a first dielectric layer 70 is added to the resistive heater subassembly 40 as shown in FIG. 4. Preferably, layer 70 provides a dielectric of about 4000V and is a 1 mil thick polyimide film such as Apical®, manufactured by Allied Signal Inc. of Morristown, N.J. The location of first shield layer 72 in relation to resistive heater subassembly 40 and the aircraft wing surface 48 is shown in FIG. 5. Shield layer 72 provides ground fault protection as disclosed in U.S. Pat. No. 5,361,183 entitled "Ground Fault Protection for Electrothermal De-Icing Applications", issued to co-applicant E. G. Weise and assigned to the same assignee, the disclosure of which is hereby incorporated by reference. Shield layer 72 controls the path of capacitive leakage current that flows from heater element 22 to the aircraft wing 48 by conducting the leakage current to a current sensing means.

Experimentation of heater assembly 20 also determined that when heater assembly 20 becomes wet, for example during a rain shower, capacitive leakage current flows from heater layer 22 to the grounded water layer atop heater assembly 20. Second shield layer 74 and second dielectric layer 76 provide ground fault protection during those circumstances. Shield layer 74 controls the path of capacitive leakage current that flows from heater element 22 to the grounded water layer by conducting the leakage current to a current sensing means for ground fault protection.

The surface area dimensions of shield layers 72 and 74 closely approximate the surface area dimensions of heater subassembly 40. Shield layers 72 and 74 may be any highly conductive material, such as copper or aluminum so long as they are compatible with the mechanical and thermal stresses experienced by heater layer 22. Preferably, shield layers 72 and 74 are constructed from the same conductive material as the heater layer 22.

EXAMPLE

Figure 6:
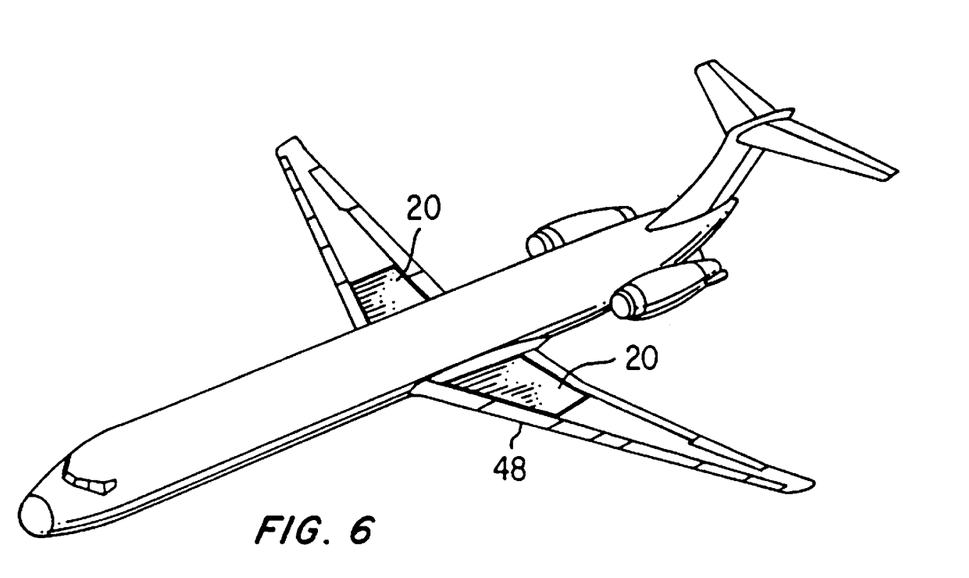
FIG. 6 illustrates an application of the invention on the exterior wing surface of an aircraft.

The following is an example of the steps used to manufacture one embodiment of the invention for installation on a commercial aircraft, such as a McDonnell Douglas MD-80, as shown in FIG. 6, to prevent ice ingestion into the aircraft engines Multiple heater element sub-assemblies 40 were fabricated using NCCF non-woven fabric, available from Technical Fibre Products of the United Kingdom, housing a dry weight of approximately 12 grams per square meter. The NCCF was cut into the desired shape of the heater. Insulated copper foil bus bars (0.0027" thick, composition per UNS C11000) were attached in the desired configuration to the fabric using a silver-filled conductive adhesive available from W. R. Grace of Wobourn, Mass. The silver adhesive was thinned 25 percent by weight with toluene to allow the adhesive to flow through the open fabric onto the locally bared copper foil. The applied silver adhesive was allowed to sit for 30 minutes to allow the solvent to evaporate. The silver adhesive was then cured at 155° F. for 45 minutes.

A laminate stack-up was then made using (in the following order): one layer of 1 mil thick Apical®, one layer of 3M AF3113-5M modified epoxy film adhesive, the above mentioned NCCF material with bus bars, and one layer of style 106 fiberglass cloth (per IPC-EG-140 specification). A layer of breather cloth and a nylon vacuum bag film were placed over the stack. A vacuum source was applied to the stack, evacuating under the vacuum film to a vacuum of 29" Hg. The vacuum was applied at room temperature for approximately 15 minutes.

The stack was placed in an autoclave. The pressure was elevated to between 35 to 40 psi and the vacuum bag was vented to atmosphere when the internal pressure exceeded 15 psi. The temperature of the autoclave was ramped to 250° F. to 270° F. at a rate of 2° F. to 6° F. per minute. The maximum temperature was maintained from not less than one hour while maintaining an elevated pressure of between 35 to 40 psi.

The fabricated subassemblies had a average thickness of 0.009 inches. A quality check performed after the heater subassembly cured indicated variations in resistance between heater subassemblies to be less than ±2 percent.

A heater assembly 20 with ground fault protection was fabricated by preparing a stack in the following order: two layers of 106 fiberglass cloth, one layer of NCCF non-woven fabric with insulated bus bars attached per above, one layer of 3M AF3113-5M modified epoxy film adhesive, the heater subassembly fabricated above, one layer of 3M AF3113-5M modified epoxy film adhesive, one layer of 106 fiberglass cloth, one layer of 1 mil thick Apical®, one layer of 3M AF3113-5M modified epoxy film adhesive, one layer of NCCF non-woven fabric with insulated bus bars attached per above, one layer of 106 fiberglass cloth and one layer of 3M AF32 nitrile phenolic film adhesive. The final lay-up was cured as described above, but maintained at a maximum temperature of 295° F. for a minimum of 90 minutes. The final heater assemblies had a thickness ranging from between 0.035 to 0.038 inches and exhibited rigid but flexible characteristics.

The above-described product was certified by the FAA under a supplemental type certification for use on MD-80 series aircraft.

The fully laminated and cured heating assembly 20 may then be attached to a structural element of an aircraft using any appropriate adhesive. Alternatively, the heating assembly 20 may be a layered element in a subsequent lamination process for the manufacture of an aircraft structural element, such as a leading edge.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. An electrically conductive laminate heater for anti-icing and de-icing structures, said heater capable of transferring heat generated by an electrical current applied to said heater, comprising a subassembly composed of a fabric layer of electrically conductive fibers impregnated with an adhesive resin and a first structural layer in a substantially overlapping relationship with said conductive fibers and electrical conducting means in electrical contact with said conducting fibers for conducting said electrical current, wherein the content of said adhesive resin is from between about 40 to about 60 percent weight of said subassembly, and said subassembly disposed between a second structural layer and a third structural layer, whereby said subassembly exhibits a substantially uniform electrical resistivity throughout said layer of conductive fibers.

2. The heater of claim 1 further comprising a fourth structural layer disposed between said subassembly and said second structural layer; a fifth structural layer adjacent to said third structural layer; and an abrasion layer adjacent to said fifth structural layer.

3. The heater of claim 2, further comprising an electrically conductive shield layer disposed between said third structural layer and said abrasion layer and having electrical connecting means for directing the flow of leakage current between said layer of conduction fibers and abrasion layer to a ground fault sensing means.

4. The heater of claim 1 wherein said electrically conductive fibers are nickel-coated carbon fibers.

5. The heater of claim 2 wherein said structural layers are non-conductive.

6. The heater of claim 2 wherein said subassembly has a thickness of about 0.010 inches and said heater has a thickness from about 0.035 to about 0.038 inches.

7. The heater of claim 1 further comprising a first electrically conductive shield layer disposed between said second structural layer and said electrically conductive fibers and having electrical connecting means for directing the flow of leakage current to a ground fault sensing means.

8. An electrically conductive laminate heater for anti-icing and de-icing structures, said heater capable of transferring heat generated by an electrical current applied to said heater, comprising:
   a) a laminate subassembly having, from the bottom to the top:
      i) a first adhesive layer containing an adhesive content,
      ii) a fabric layer comprising electrically conducting fibers,
      iii) conducting means to provide electrical energy to said conducting fibers, and
      iv) a first structural layer and cured under elevated vacuum and temperature conditions whereby said adhesive content is controlled to be less than about 60 percent but greater than about 40 percent of the weight of said subassembly;
   b) a protective carrier assembly having, from the bottom to the top:
      v) a second structural layer,
      vii) a second adhesive layer,
      viii) a third adhesive layer,
      ix) a third structural layer,
      x) an abrasion resistant layer;
   whereby said subassembly is embedded between said second and third adhesive layer and the combination subassembly and protective carrier is cured under elevated vacuum and temperature conditions.

9. A process for manufacturing an electrically conductive laminate heater for anti-icing and de-icing structures, said heater capable of transferring heat generated by an electrical current applied to said heater, comprising:

a) preparing a laminate subassembly having, from the bottom to the top:
   i) a first adhesive layer,
   ii) a fabric layer comprising electrically conducting fibers,
   iii) conducting means to provide electrical energy to said fabric layer, and
   iv) a first structural layer and cured under elevated vacuum and temperature conditions whereby said adhesive content is controlled to be less than about 60 percent but greater than about 40 percent of the weight of said subassembly;

b) curing said subassembly under elevated vacuum and temperature conditions whereby said subassembly exhibits a substantially uniform electrical resistivity throughout said layer of conductive fibers;

c) preparing a protective carrier assembly having, from the bottom to the top:
   v) a second structural layer,
   vi) a second adhesive layer,
   vii) a third adhesive layer,
   viii) a third structural layer,
   ix) a fourth adhesive layer, and
   x) an abrasion resistant layer;

d) embedding said subassembly between said second and third adhesive layer; and e) curing said combination subassembly and protective carrier assembly under elevated vacuum and temperature conditions.

10. The process of claim 9 further comprising the step of controlling the adhesive content of said first adhesive layer to be less than about 60 percent but greater than about 40 percent of the weight of said subassembly.

11. The process of claim 9 further comprising the step of testing said subassembly for a substantially uniform resistivity throughout said layer of said conductive fibers.

* * * * *